(12) United States Patent
Caër et al.

(10) Patent No.: US 11,372,269 B2
(45) Date of Patent: Jun. 28, 2022

(54) SILICON PHOTONIC TUNABLE DEVICE WITH THERMO-OPTIC CHANNEL

(71) Applicant: International Business Machines Corporation, Armonk, NY (US)

(72) Inventors: Charles Caër, Adliswil (CH); Gustavo Ferreira Villares, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/104,594

(22) Filed: Aug. 17, 2018

(65) Prior Publication Data

US 2020/0057319 A1 Feb. 20, 2020

(51) Int. Cl.
*G02F 1/01* (2006.01)
*G02F 1/025* (2006.01)

(52) U.S. Cl.
CPC ............ *G02F 1/0147* (2013.01); *G02F 1/025* (2013.01); *G02F 2203/15* (2013.01)

(58) Field of Classification Search
None
See application file for complete search history.

(56) References Cited

U.S. PATENT DOCUMENTS

| | | | | |
|---|---|---|---|---|
| 5,117,470 A | * | 5/1992 | Inoue | G02B 6/122 385/1 |
| 5,966,493 A | * | 10/1999 | Wagoner | G02B 6/266 385/140 |
| 6,240,226 B1 | * | 5/2001 | Presby | G02F 1/3136 385/145 |
| 6,385,383 B1 | * | 5/2002 | Marcuse | G02B 6/1221 385/140 |
| 9,081,215 B1 | | 7/2015 | Zortman et al. | |
| 9,612,458 B1 | | 4/2017 | Lentine et al. | |
| 2002/0018636 A1 | * | 2/2002 | Bischel | G02B 27/283 385/140 |
| 2008/0075060 A1 | | 3/2008 | Tiirola et al. | |
| 2009/0226129 A1 | * | 9/2009 | Kuipers | G02F 1/3132 385/14 |
| 2015/0097260 A1 | * | 4/2015 | Tu | G01N 27/18 257/467 |
| 2016/0025626 A1 | | 1/2016 | Dos Santos Fegadolli et al. | |
| 2016/0313504 A1 | | 10/2016 | Ramaswamy et al. | |
| 2017/0146740 A1 | | 5/2017 | Orcutt et al. | |
| 2018/0013512 A1 | * | 1/2018 | Akiyama | G02B 6/12007 |

OTHER PUBLICATIONS

Ryan Enright et al. "A Vision for Thermally Integrated Photonics Systems" Bell Labs Technical Journal vol. 19. [retrieved Aug. 2018].

* cited by examiner

*Primary Examiner* — Chris H Chu
(74) *Attorney, Agent, or Firm* — Harrington & Smith

(57) ABSTRACT

A silicon photonic device is provided including a substrate; a passive silicon optical device, on the substrate; an electrically insulating cladding layer that encapsulates the optical device on the substrate, the cladding layer including a trench patterned therein, so as for the trench to at least partly cover the optical device, on a side of the latter, the trench filled with an electrically insulating, thermally conducting material, having a refractive index that is lower than a refractive index of silicon, thereby forming a heat conduction channel toward the optical device; and a heating element, in contact with the thermally conducting material. A method of operating such silicon photonic devices is also provided.

18 Claims, 4 Drawing Sheets

SILICON PHOTONIC TUNABLE DEVICE WITH THERMO-OPTIC CHANNEL

BACKGROUND

The invention relates in general to the field of silicon photonic devices and in particular to tunable devices, i.e., whose operating wavelength can be tuned through heaters, as well as method of operating such devices.

Several devices, such as wavelength-division multiplexing (WDM) devices and phase tuning elements, require heaters for wavelength tuning and/or locking. Such heaters are normally realized as resistive elements placed above a waveguide, so as to heat the latter by Joule effect. Now, in a silicon photonics platform, the silicon and the metal resistor will be separated by a silica cladding, in order to prevent absorption losses. However, silica is a material that has a poor thermal conductivity. Therefore, a silicon photonics platform that includes tunable devices requires a large amount of power to heat the silicon waveguide.

SUMMARY

According to a first aspect, the present invention is embodied as a silicon photonic device. The device basically comprises a substrate, a passive silicon optical device (on the substrate), an electrically insulating cladding layer, and a heating element. The electrically insulating cladding layer encapsulates the optical device on the substrate. The cladding layer comprises a trench, which is patterned in this cladding layer, so as for the trench to at least partly cover the optical device, on a side of the latter. The trench is filled with an electrically insulating, thermally conducting material, which has a refractive index that is lower than a refractive index of silicon. The filled trench forms a heat conduction channel toward the optical device and the heating element is in contact with the thermally conducting material.

According to a second aspect, the invention is embodied as a method of operating a silicon photonic device such as described above. The method basically revolves around heating the passive silicon optical device via the heat conduction channel, e.g., so as for an operative wavelength of the passive optical device to reach a pre-defined value. This operative wavelength may possibly be monitored to adaptively adjust the heating, so as to maintain the monitored wavelength at a pre-defined value.

Devices, apparatuses, and methods embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1:
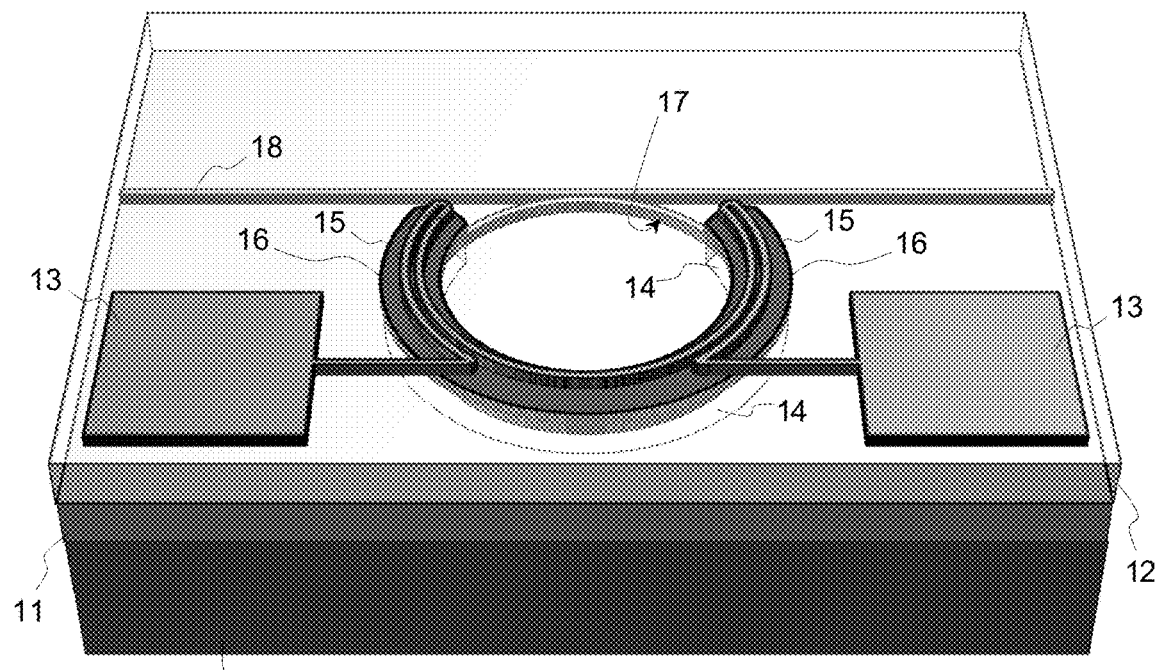
FIG. 1 is a 3D view of a silicon photonic device, according to embodiments.
Figure 2:
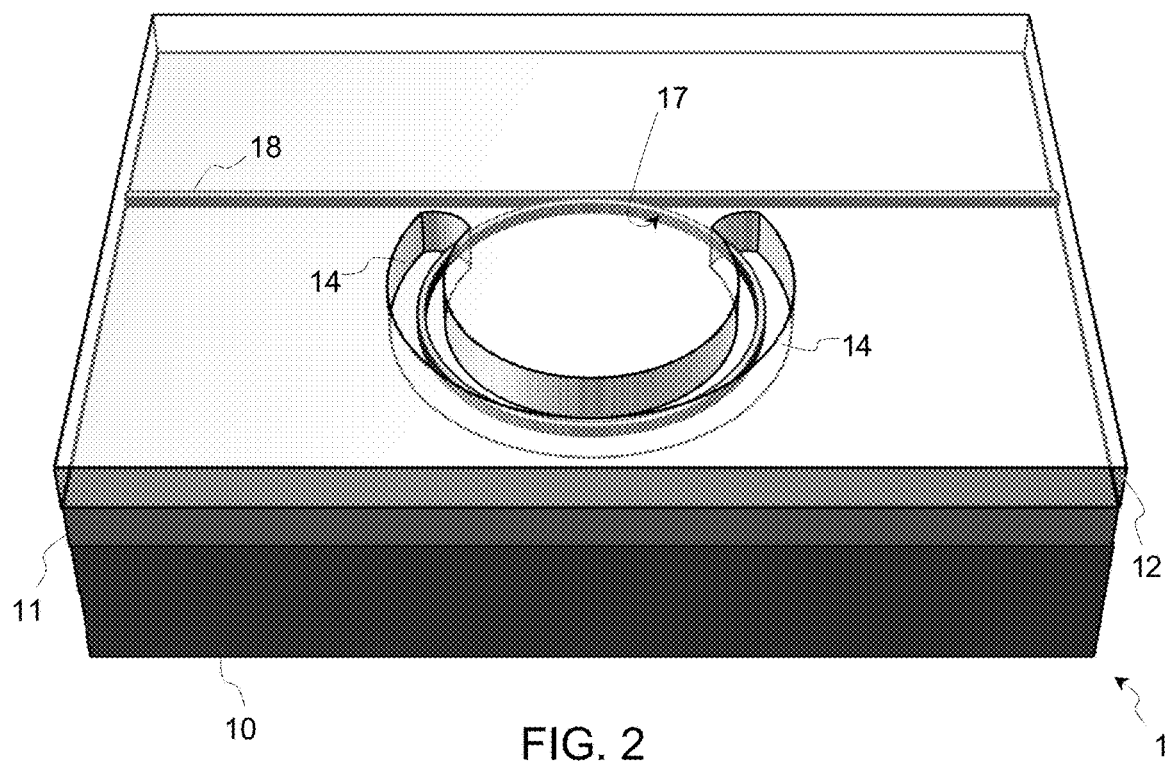
FIG. 2 shows the same 3D view as in FIG. 1, except that the metal pads, the heating element and the thermally conducting material filing the trench are omitted, in order to reveal the shape of the trench and the passive optical device (a ring resonator coupled to a waveguide in this example)

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION OF EMBODIMENTS OF THE INVENTION

As noted in the background section, devices such as wavelength-division multiplexing (WDM) devices and phase tuning elements require heaters (for wavelength tuning and/or locking purposes), which are typically made as resistive elements placed above passive optical elements (e.g., including one or more waveguides). Now, the silicon and metal resistor of a silicon photonics platform are normally separated by a silica cladding, in order to prevent absorption losses. However, the poor thermal conductivity of silica would require substantial power to heat the passive components. Also, the time-response of the heater is limited, typically to 10s of µs.

To address these issues, the present Inventors have devised new designs of silicon photonic devices, wherein a heat channel is suitably integrated in the silicon platform to enable an efficient heat transfer from the resistor to the passive optical device.

In reference to FIGS. 1-5, an aspect of the invention is first described, which concerns a silicon photonic device 1.

The device 1 basically comprises a substrate 10, 11, a passive silicon optical device 17, 18, which is arranged on the substrate 10, 11, an electrically insulating cladding layer 12, and a heating element 15.

The electrically insulating cladding layer 12 (e.g., silica) encapsulates the optical device 17, 18 on the substrate 10, 11, which typically includes a silicon layer 10 and an insulating layer 11, which typically is a buried oxide layer, e.g., a silicon oxide or aluminum oxide (sapphire) layer. The cladding layer 12 comprises a trench 14, which is patterned therein.

The trench 14 is patterned in such a manner that it covers (at least partly) the optical device 17, 18, on a side of the latter. E.g., the trench may overlay (that is, lie on top of) a part or a portion, at least, of the device 17, 18, or laterally extend, opposite thereto.

The trench 14 is otherwise filled with an electrically insulating, thermally conducting material 16. This material 16 has a refractive index that is lower than a refractive index of silicon (Si).

Ideally, a large refractive index contrast is needed between the Si components and the cladding (including the thermal heat channel), be it to allow smaller bends in the passive devices and, in turn, a smaller footprint for the Si photonics platform. Besides, the heating element 15 is in contact with the thermally conducting material 16. This way, the filled trench 14, 16 forms a heat conduction channel toward the optical device 17, 18.

The thermally conducting material 16 may possibly comprise different materials, e.g., forming several layers of materials, which involve different refractive indices. Still, such materials should altogether be such as to have an effective refractive index that is less than the refractive index of silicon.

According to the present approach, a heat channel is achieved, which ensures a suitable thermal conduction and thus enables an efficient heat transfer from the heater 15 to the passive optical device 17, 18. The heat channel can be suitably integrated in the silicon platform, while properties of the cladding can be essentially preserved, in order to prevent absorption losses.

In embodiments as disclosed herein, the passive elements 17, 18 can be very efficiently heated by thermally connecting the metal heater 15 through an aluminum nitride (AlN) via. This material has a very high thermal conductivity, a large bandgap (and thus a very low electrical conductivity, i.e., the very large bandgap of ~6 eV makes AlN an excellent electrical insulator), and further has a low refractive index. Altogether, this enables a very efficient heat transfer without introducing optical losses.

In more detail, the in-plane profile of the trench 14 is preferably shaped according to the in-plane shape of a portion (at least) of the optical device 17, 18. This, in practice, typically means that a projection of the profile of the trench 14 overlaps with or is contiguous to a projection of a portion of the optical device 17, 18, in a projection plane (x, y), i.e., a plane parallel to the average plane of the cladding layer 12.

For example, portions of the passive optical element 17 and the trench 14 may both have a curved profile, as in FIGS. 1-5. Yet, the profile of a portion of the passive element may be included in the profile of the trench 14, in projection (see FIG. 3A). That is, the trench 14 shall typically be wider (in-plane) than the portion of the optical element 17.

In variants, the shape of the trench may partly enclose, in projection, the shape of a portion of a passive element 17, 18, e.g., while being laterally contiguous with said portion, in projection. An example of such a variant is shown in FIG. 3B as device 1a. In this case, the trench can be made closer to a lateral side of the passive element 17, whereas it can be made closer to the top surface of this element in the example of FIG. 3A. Which variant is the best depends on the actual geometry of the passive device.

Figure 3A:
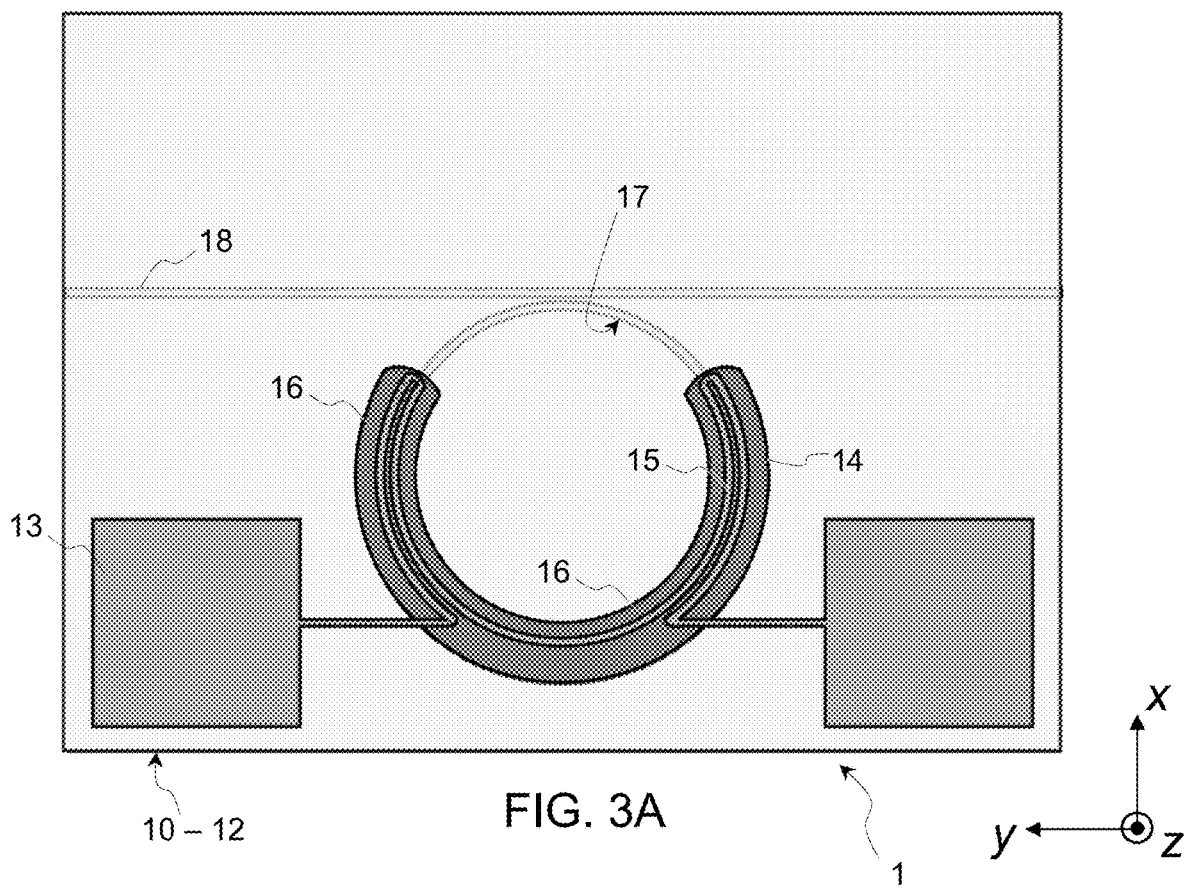
FIG. 3A is a top view of the device of FIG. 1.
Figure 3B:
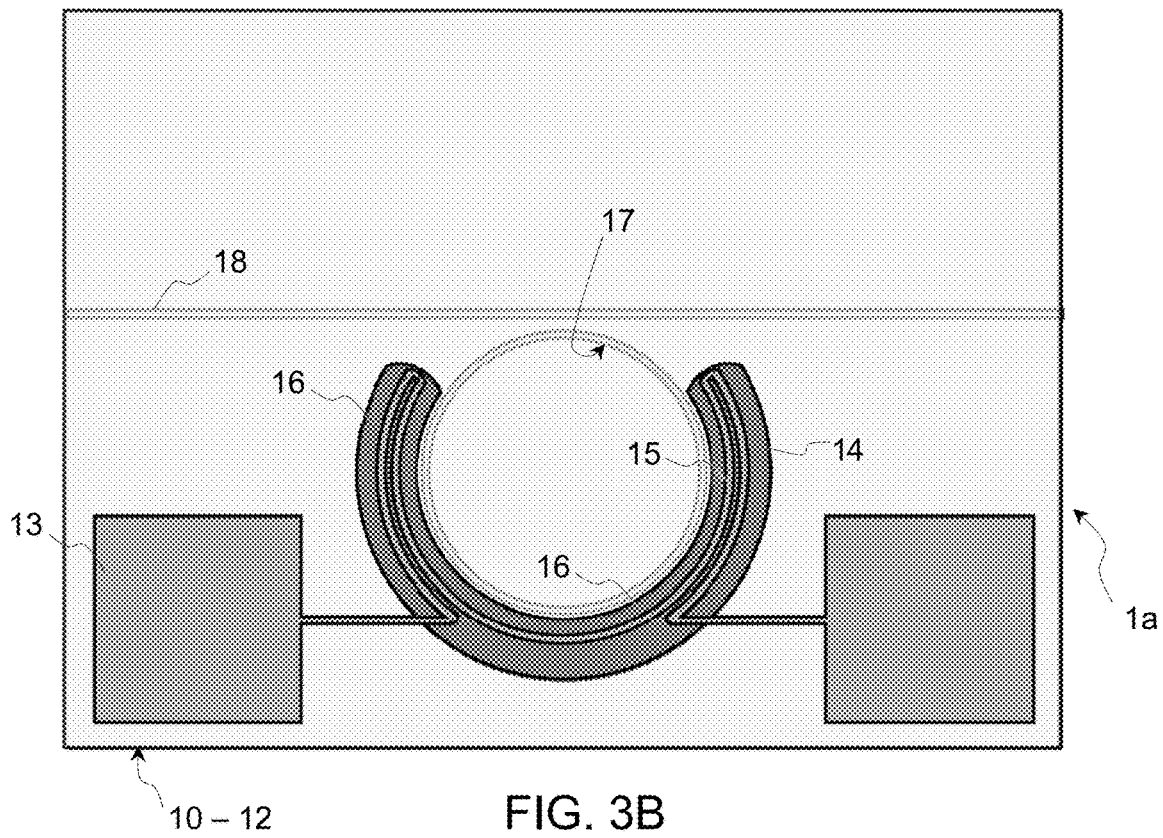
FIG. 3B is a top view of a variant to the device of FIG. 1.
Figure 4:
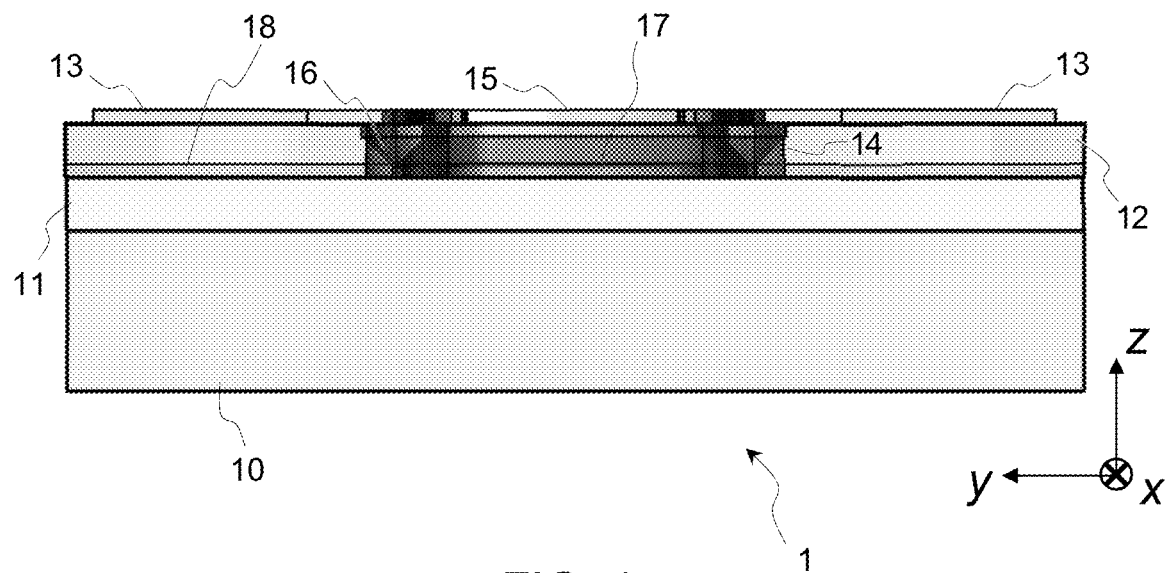
FIGS. 4 and 5 respectively show a front view and a side view of the device of FIG. 1, using transparency and linework for depiction purposes.
Figure 5:
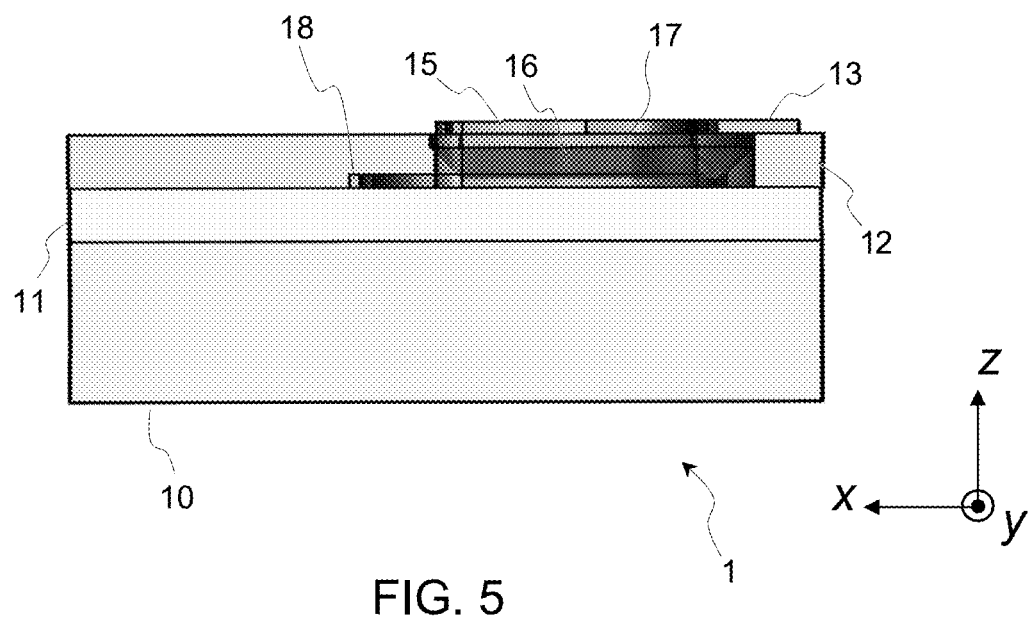

In other words, the trench 14 may extend above or laterally enclose a portion of a passive optical element 17, 18, as exemplified in FIGS. 3A, 3B. That is, the in-plane shape of said portion may be vis-à-vis the in-plane profile of the trench 14, as in FIGS. 1-3A, 4, and 5, or the in-plane profile of the trench 14 may enclose, in projection, the in-plane shape of said portion, in a plane parallel to (x, y), as in FIG. 3B.

As a result, the shape of the thermally conducting material 16 too reflects (at least partly) the shape of the optical device 17, 18, or a portion thereof. In the example of FIGS. 1-5, the trench 14 is shaped as a partial ring, and so is the material 16, which both reflect the ring shape of the passive element 17.

As further seen in FIGS. 1, 3A and 3B, the heating element 15 too may be shaped according to the in-plane profile of the trench 14. That is, the heating element 15 extends along a substantial portion of the trench 14. A "substantial portion" means that at least 50% of the length of the trench 14 is covered by the heater.

In that respect, the heating element 15 may advantageously be formed as a single bar that is folded in-plane so as to exhibit one or more kinks. This way, the heater 15 can be patterned as a single-piece element, in one process step, while its shape may nevertheless reflect the shape of the passive element 17.

In embodiments as depicted in the accompanying drawings, the silicon photonic device 1 further comprises two metal pads 13, which are arranged on the cladding layer 12, e.g., on each side of the heating element 15, and connected to this element 15. Such pads 13 can easily be contacted, electrically, so as to be able to inject an electrical current through the heating element 15, in operation of the device 1. Note, however, that the two metal pads 13 need not necessary be located in a region of the chip where electronics coexists with the photonics, contrary to what depictions in the accompanying drawings may suggest. I.e., the pads 13 may be more remotely located from the heater 15.

In embodiments, the two metal pads 13 and the heating element 15 are altogether formed into a single piece, on the cladding layer 12, as assumed in FIGS. 1 and 3. I.e., such elements may be integrally formed as a single piece, out of a suitably patterned, single layer of material. Yet, the deposition of the heat channel material 16 does not necessarily require a planar top surface (before the metal deposition). This can instead be obtained by a chemical/mechanical polishing step, so as to planarize the wafer.

The passive silicon optical device 17, 18 is preferably structured from a top silicon layer of a silicon on insulator (SOI) wafer, which forms part of the substrate 10, 11. The SOI wafer comprises a Si substrate 10 and a buried oxide layer 11, on top of the Si substrate 10. Initially, the SOI wafer further comprises a top Si layer and the passive optical elements 17, 18 can be patterned in this initial top layer. After patterning, the residual elements 17, 18 are embedded in the insulating cladding layer 12.

In that respect, the present silicon photonic devices may typically include a silicon photonics chip, which itself includes the passive silicon optical device 17, 18. The chip may otherwise include (i.e., be formed by) portions of the substrate 10, 11 and the electrically insulating cladding layer 12.

In the examples of FIGS. 1-5, the passive silicon optical device 17, 18 comprises a ring resonator 17 and a bus waveguide 18. Such elements 17, 18 are arranged so as for the ring resonator 17 to be optically coupled to the bus waveguide 18, in operation of the device 1. Resonators are basic building blocks for a number of present and future integrated photonic components, such as switches, lasers, filters and sensors.

In variants, the passive optical device 17, 18 may be designed as a filter for wavelength-division multiplexing or de-multiplexing operations, or, still, as a phase tuning element. In particular, the device 17, 18 may be designed as a bandpass filter, a notch filter, an optical reflector (e.g., a Bragg mirror, a Sagnac loop), etc.

The electrically insulating, thermally conducting material 16 preferably comprises aluminum nitride (AlN), whose thermal and electrical properties nicely match the present requirements. In variants, one may use silicon nitride ($Si_3N_4$), although its thermal conductivity is one order of magnitude smaller than AlN. In other variants, the material 16 may comprise silicon carbide (SiC). However, silicon carbide has a suboptimal refractive index (between 2.5 and 2.7 for infrared radiation). Thus, it is preferred to use AlN.

In all cases, the thermally conducting material 16 should much preferably have a thermal conductivity that is larger than 30 $W \cdot K^{-1} \cdot m^{-1}$, and more preferably larger than 70 $W \cdot K^{-1} \cdot m^{-1}$. The use of AlN vias allows a dramatic reduction of the consumed power, and a strong reduction of the response time, compared to pure silica claddings.

An AlN via can be realized using standard process such as optical lithography, plasma etching and sputtering. The AlN material may for instance be sputtered to form an AlN film or, still, be deposited or grown as a single-crystalline AlN film.

The thermal conductivity of single-crystalline AlN is of about 285 $W \cdot K^{-1} \cdot m^{-1}$, while the conductivity of a sputtered film may lower down to about 100 $W \cdot K^{-1} \cdot m^{-1}$. Advantageously enough, AlN is furthermore transparent at telecom wavelength, has a refractive index (n~2.0) that is satisfactorily less than the index of silicon, and further has a very low electrical conductivity ($E_g$=6.0 eV). In addition, AlN is compatible with complementary metal oxide semiconductor (CMOS) processes, which makes it a very suitable candidate for applications to CMOS platforms. Optically speaking, using AlN allows a very limited change of mode confinement to be obtained.

The index mismatch between the oxide region 12 and the AlN region 16 can even be further mitigated by patterning the AlN into an adiabatic taper. As the refractive index between the two materials is low and the optical mode is tightly confined in the silicon, no complex design or highly accurate patterning of the trench is required.

In variants to AlN, other materials can be contemplated, such as $Si_3N_4$, SiC, or, still, boron nitride (BN). Boron nitride fits all requirements in terms of material properties, although polycrystalline BN shows a degraded thermal conductivity. Gallium nitride (GaN) has a fitting thermal conductivity (~130 $W \cdot K^{-1} \cdot m^{-1}$ for crystalline GaN) but its refractive index (n=2.31 at λ=1550 nm) is suboptimal. Plus, GaN is difficult to pattern.

Embodiments evoked above can be combined in multiple ways. In an example, the passive silicon optical device simply consists of a ring resonator 17 coupled to a bus waveguide 18, as seen in FIGS. 1-5. The silicon device 17, 18 is realized on a SOI wafer and encapsulated in a silicon oxide cladding. The trench 14 is patterned above and/or around the silicon device 17, 18 and filled with AlN. As the one skilled in the art will appreciate, the waveguide design can further be optimized in order to achieve an adiabatic transition from the oxide region to the AlN region. Next, a resistor heater made of tungsten or another CMOS-compatible metal is deposited on the AlN layer and else patterned above the silicon device 17, 18. Finally, two metal pads 13 are connected to the resistor 15 for injecting electrical current.

Experiments conducted by the Inventors have shown that the heat transfer from the heater to the waveguide can be made extremely efficient, especially when using AlN. In that case, the temperature is almost equal in the metal resistor and the silicon waveguide, in operation of the device 1. The height of the AlN channel has no measurable influence on the heat transfer, due to its very high thermal conductivity. In comparison, the required power to heat the passive element is considerably larger when cladded with a pristine oxide. In practice, the heat transfer remains very efficient even when using a sputtered AlN thin film, compared to single crystalline AlN.

For applications to CMOS-platforms, each of the thermally conducting material 16 and the heating element 15 (as well as associated pads 13, if necessary) should be selected from CMOS-compatible materials. A variety of CMOS-compatible metals may be used for the heater 15. Preferred is to use tungsten heaters, though any CMOS-compatible metal as commonly used in the semiconductor industry may also be contemplated (e.g., NiSi).

Figure 6:
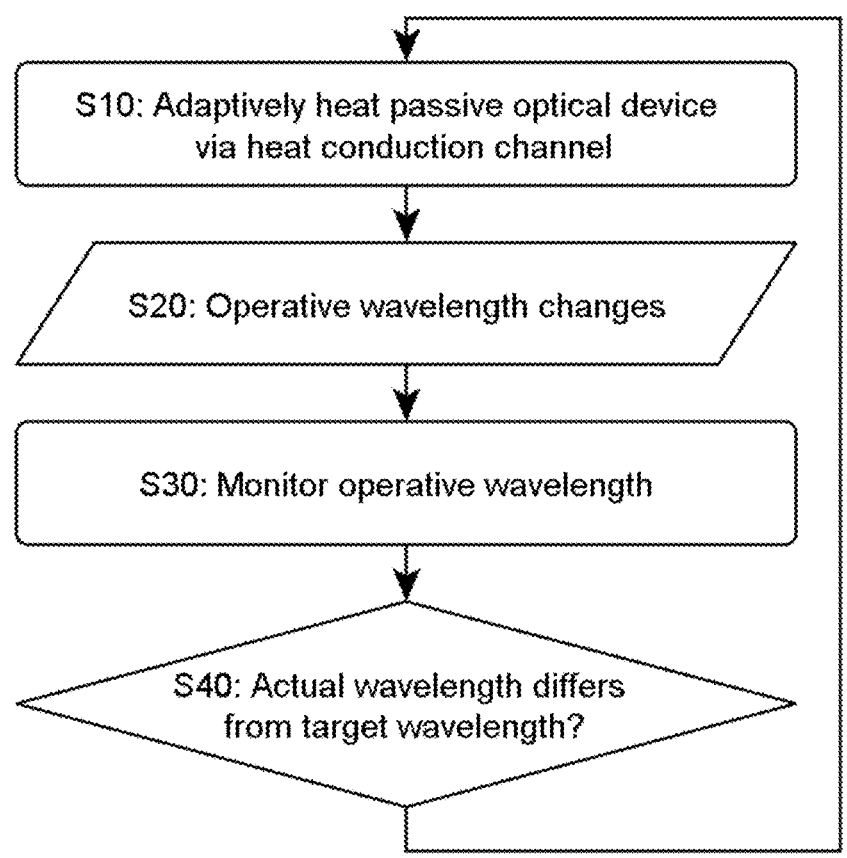
FIG. 6 is a flowchart illustrating high-level steps of a method of operating a device such as depicted in FIGS. 1-5, as involved in embodiments.

Referring to FIG. 6, another aspect of the invention is now briefly described, which concerns a method of operating a silicon photonic device 1 such as described above.

Basically, this method revolves around heating (step S10, FIG. 6) the passive silicon optical device 17, 18 via the heat conduction channel 14, 16, in order to adjust properties of the device 17, 18. This is typically done S10 so as for an operative wavelength of the passive elements 17, 18 to reach (step S20) a pre-defined value.

For example, this operative wavelength may be monitored S30. In turn, the heating of the passive silicon optical device 17, 18 can be adaptively adjusted S40, S10, so as to maintain S10-S40 the monitored wavelength at said pre-defined value, e.g., using a mere feedback loop.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than the materials explicitly mentioned could potentially be envisaged.

What is claimed is:

1. A silicon photonic device comprising:
a substrate, said substrate including a silicon layer and an insulating layer;
a passive silicon optical device on the insulating layer of the substrate, said passive silicon optical device including a ring resonator shaped as a ring and a bus waveguide, said ring resonator and said bus waveguide being optically coupled to one another, said ring resonator and said bus waveguide both being of silicon;
a single electrically insulating cladding layer on the insulating layer of the substrate, said ring resonator and said bus waveguide formed at least partly in said electrically insulating cladding layer, said electrically insulating cladding layer having a trench at least partly coinciding with and being shaped as a partial ring that reflects the shape of a first portion which is a majority of the ring resonator, the trench at least partly uncovering the ring resonator for the first portion of the ring resonator, the trench not uncovering the bus waveguide and a second portion of the ring resonator adjacent to the bus waveguide;
an electrically insulating, thermally conducting material filling the trench in said electrically insulating cladding layer, the thermally conducting material filling the trench, said electrically insulating, thermally conducting material having a refractive index lower than a refractive index of silicon and providing a heat conduction channel toward the ring resonator for heating the ring resonator; and a heating element on the electrically insulating thermally conducting material, and extending thereon along a substantial portion thereof, whereby the temperature of the ring resonator is adjusted to tune the ring resonator to a pre-defined operative wavelength.

2. The silicon photonic device according to claim 1, wherein the trench has an in-plane profile shaped according to an in-plane shape of at least a portion of the ring resonator.

3. The silicon photonic device according to claim 2, wherein the in-plane shape of said portion is vis-à-vis the in-plane profile of the trench.

4. The silicon photonic device according to claim 2, wherein the in-plane profile of the trench encloses, in projection, the in-plane shape of said portion of the ring resonator in a plane parallel to an average plane of the cladding layer.

5. The silicon photonic device according to claim 2, wherein the heating element is shaped according to said in-plane profile, so as to extend along a substantial portion of the trench.

6. The silicon photonic device according to claim 5, wherein the heating element is formed as a single bar folded in-plane so as to exhibit one or more kinks.

7. The silicon photonic device according to claim 5, wherein the trench is formed around a lateral surface of the portion of the ring resonator.

8. The silicon photonic device according to claim 1, further comprising two metal pads arranged on the cladding layer and connected to the heating element, so as to be able to inject an electrical current through the heating element during operation of the silicon photonic device.

9. The silicon photonic device according to claim 8, wherein the two metal pads and the heating element are formed of a single piece on the cladding layer.

10. The silicon photonic device according to claim 1, wherein the passive silicon optical device is structured from a top silicon layer of a silicon on insulator wafer, the latter forming part of said substrate.

11. The silicon photonic device according to claim 1, wherein said electrically insulating, thermally conducting material has a thermal conductivity larger than 30 W·K$^{-1}$·m$^{-1}$.

12. The silicon photonic device according to claim 11, wherein the silicon photonic device further comprises a silicon photonics chip including said passive silicon optical device, the chip otherwise formed by portions of said substrate and said electrically insulating cladding layer.

13. The silicon photonic device according to claim 1, wherein said electrically insulating, thermally conducting material comprises aluminum nitride.

14. The silicon photonic device according to claim 1, wherein each of the thermally conducting material and the heating element is made of a CMOS-compatible material.

15. The silicon photonic device according to claim 1, wherein the heating element is formed to reflect the shape of the trench and corresponding electrically insulating, thermally conducting material, and is formed in part as a single bar folded in-plane so as to exhibit a kink at each end.

16. The silicon photonic device according to claim 15, wherein the heating element further comprises another, first kink to allow the material of the heating element to turn from and join a first orientation with a first end of the single bar part and comprises another, second kink to allow the material of the heating element to turn from and join the second end of the single bar part with a second orientation of the material of the heating element.

17. The silicon photonic device according to claim 16, wherein the first and second orientations are a same orientation.

18. A method of operating a silicon photonic device, wherein the silicon photonic device comprises:

a substrate, said substrate including a silicon layer and an insulating layer;

a passive silicon optical device on the insulating layer of the substrate, said passive silicon optical device including a ring resonator shaped as a ring and a bus waveguide, said ring resonator and said bus waveguide being optically coupled to one another, said ring resonator and said bus waveguide both being of silicon;

a single electrically insulating cladding layer on the insulating layer of the substrate, said ring resonator and said bus waveguide formed at least partly in said electrically insulating cladding layer, said electrically insulating cladding layer having a trench at least partly coinciding with and being shaped as a partial ring that reflects the shape of a first portion which is a majority of the ring resonator, the trench at least partly uncovering the ring resonator for the first portion of the ring resonator, the trench not uncovering the bus waveguide and a second portion of the ring resonator adjacent to the bus waveguide;

an electrically insulating, thermally conducting material filling the trench in said electrically insulating cladding layer, the thermally conducting material filling the trench, said electrically insulating, thermally conducting material having a refractive index lower than a refractive index of silicon and providing a heat conduction channel toward the ring resonator for heating the ring resonator; and a heating element on the electrically insulating thermally conducting material, and extending thereon along a substantial portion thereof, whereby the temperature of the ring resonator is adjusted to tune the ring resonator to a pre-defined operative wavelength;

and wherein the method comprises:

heating the ring resonator of the passive silicon optical device via the heat conduction channel to enable an operative wavelength thereof to reach a pre-defined value; and monitoring said operative wavelength and adaptively adjusting the heating of the passive silicon optical device to maintain the monitored wavelength at said pre-defined value.

* * * * *